May 27, 1947.  W. E. BAIER  2,421,063
METHODS FOR RECOVERY OF NARINGIN
Filed March 11, 1944

1. NARINGIN CONTAINING SOURCE MATERIAL — AS GRAPEFRUIT PULP

2. FIRM OR HARDEN — AS WITH LIME

3. EXTRACT NARINGIN — AS WITH LIME

4. SEPARATE LIQUOR

5. ACIDIFY — AS WITH HCl

6. CRYSTALLIZE

7. SEPARATE CRYSTALS

8. RECRYSTALLIZE — IF DESIRED

INVENTOR
WILLARD E. BAIER.
by Robert E. Harris
ATTORNEY

Patented May 27, 1947

2,421,063

UNITED STATES PATENT OFFICE 2,421,063

METHOD FOR RECOVERY OF NARINGIN

Willard E. Baier, Ontario, Calif., assignor to California Fruit Growers Exchange, Los Angeles, Calif., a corporation of California Application March 11, 1944, Serial No. 526,090

8 Claims. (Cl. 260—210)

1

This invention relates to a new and useful process for the recovery of naringin from plant source material.

An object of this invention is improvement in the recovery of naringin, with special reference to decrease in the cost of recovery and improvement in the yield, color, and purity of the naringin obtained.

A further object is the provision of a single direct extraction step using as an extractant an alkaline earth compound.

These and further objects and advantages will appear more fully to those skilled in the art from a consideration of the invention as set forth in the following description and in the appended claims.

The drawing is a flow sheet containing an illustrative showing of my preferred process.

Grapefruits are first preferably treated to remove the juice therefrom, or the juice portion of the fruit may be removed entirely. The juice may be removed by reaming from the fruit or by passing the whole fruit through a pulping machine or a suitable press. In processes where the grapefruit hearts are to be canned as such, the peel will be removed from the juice ball. This operation is often performed commercially by hand.

If the peel is separated in large pieces from the juice portion, the peel should now preferably be disintegrated to such an extent as to be of uniformly small particle size, so as to permit convenient access by the reagent. I have found that if the peel is passed through a press of the food chopper variety in which the face plate has openings of about ⅜ inch in diameter, the peel particles will be satisfactory for my purpose. It should be understood that as much of the rag and interior pulp as may be desired may be included with the peel in my naringin recovery process. The particular manner in which the peel and pulp is comminuted is of significant importance only insofar as it may affect the access of reagents to the pulp and the ease with which the mass is handled through various types of equipment.

This produces a representative source material indicated at 1 on the drawing. The pulp is then mixed with a sufficient amount of calcium hydroxide to cause a firming or hardening, indicated at 2. Since a portion of the calcium hydroxide will be neutralized by any acid present, the particular amounts of calcium hydroxide to be added will vary, depending upon the acidity of the mass being treated. Where the preliminary process has been such as to include in this pulp a fair amount of the natural acid of the fruit, as in a bulk or a mechanical juicing operation, I find that the amount of lime added at this point may suitably run as high as fifteen pounds per ton in order to alkalinize the pulp sufficiently to give the best hardening. Where the peel has been separated with little or no admixture of juice, amounts as low as five or six pounds per ton will produce suitable hardening. Intimate mixing of the lime with the peel will promote more rapid hardening.

The peel mixed with lime is then placed in a false bottom tank with an amount of water weighing approximately one and one-half times the weight of the peel. The water is then pumped from beneath the false bottom and recirculated over the peel. Additional quantities of lime are now added, as required, ordinarily in decreasing amounts, to the circulating liquor until the pH of the liquor remains within the range of from pH 8.4 to pH 9.1 when in equilibrium with the peel. When equilibrium within the specified pH range has been established between the liquor and the peel the extraction will ordinarily be completed. This extraction step is indicated in the drawing at 3.

The liquor is now placed in the crystallizing tank. It will not ordinarily be necessary to filter this liquor since it will have clarified itself sufficiently by being recirculated through the pulp bed in the circulation tank and simple removal of the liquor from the bottom of the false bottom tank will give satisfactory separation of the liquor from the pulp, indicated at 4. The liquor may, therefore, be acidified immediately and without further processing to within the desired pH range for the crystallization from it of the naringin which will have been extracted directly by the action of the lime upon the peel.

The liquor should be adjusted to within a range of about pH 4 to about pH 5, which I find gives very good crystallization. This acidification is conveniently and economically effected with hydrochloric acid, and is indicated at 5.

After adjustment of the pH, the naringin is allowed to crystallize from the liquor. The crystallization step is indicated generally at 6. The naringin separation step may be carried out in any desired and known manner, and is shown on the flow sheet at 7. If it is desired to improve the purity of this product, purification may be effected by subsequent recrystallization steps, which are all well known and are indicated at 8.

Naringin is a natural glycoside having the empirical formula $C_{27}H_{32}O_{14}$. One of the most prolific sources is the peel and rag of the grapefruit. It is also reported to occur in relatively large quantities in the leaves. This glycoside seems so far only to have been reported in a few members of the Citrus genus, being most commonly reported as obtained from the grapefruit, which is variously identified as *Citrus grandis*, Osbeck, and *Citrus decumana*, Linn. (The Standard Cyclopedia of Horticulture, by L. H. Bailey, The MacMillan Company, 1935) and identified as derived from *Citrus maxima* (Webster's New International Dictionary, second edition). One recent worker has reported naringin as appearing in Indian shaddock, which is apparently a clearly distinguished variety of *Citrus maxima* (Webster's New International Dictionary, second edition).

Several methods are known for the extraction of naringin from its source material. One such method depends upon the much greater solubility of the naringin in hot water than in cold. This method consists essentially of boiling up the grapefruit pulp with water, followed by straining and cooling. Manifestly this method is capable of introducing considerable quantities of impurities.

Another method which can be used depends upon solubilization by treatment with an alkali, such as sodium hydroxide.

I wish to emphasize at this point that in those processes the liquor so obtained is of such a nature that it must be first clarified by filtration or by other expensive means before crystallization of naringin. However, in the process herein disclosed, wherein the naringin is extracted and solubilized by an alkaline earth hydroxide, the liquor containing the naringin is readily clarified by circulating it through the pulp bed in the manner just described and as a part of the extraction step.

In my new process the naringin is extracted from the pulp by a novel method which is particularly effective in being extremely simple and easy to operate. The naringin obtained in the first crystallization step is relatively of very high purity compared with the products of other procedures, and in many instances can be put directly into use.

I prefer, as an ordinary commercial embodiment, to use lime, i. e., calcium hydroxide, for both the hardening and the extraction, for reasons of convenience and economy. But it should be noted that any alkaline earth compound which will give sufficient cations in the aqueous medium will function to harden the pulp satisfactorily.

The addition, approximately at the time of grinding, of a sufficient portion of the lime to promote firming or hardening has the beneficial effect of making the mass of pulp in the subsequently accumulated batch to be treated more accessible to percolation of the treating liquor. It is possible to add at this point all of the lime required. This requires careful metering of the lime to the pulp in order to give the desired final pH. In most commercial operations an easier and more certain control of the final equilibrium pH is obtained by this adding only a portion of the lime prior to, at the time of, or immediately following grinding, and then adding the balance to the recirculating liquor as described above, with occasional tests of the pH of the liquor.

As an alternative procedure which may prove more desirable with some arrangements of apparatus, I may proceed in the following manner: The peel which has been disintegrated to a desired degree is suspended in an amount of water equal, conveniently, to one or one and one-half times the weight of the peel being extracted. This amount of water is specified here, as well as above, as being sufficient to give convenient handling. More would simply result in a more dilute solution of naringin. Sufficient calcium hydroxide is then added to the suspension, with agitation, adding it in small amounts as the end point approaches, until the pH of the liquor lies within the range of from about 8.4 to about 9.1 at equilibrium with the peel. With a reasonable amount of agitation, equilibrium should be reached within a period of from one to two hours. The liquor containing the naringin is then separated from the pulp portion by draining and pressing. This liquor is then passed through a suitable filtering device, as, for example, a plate and frame filter press. Or, if a false bottom tank is available, recirculation through that is practiced as described in detail above to obtain a clear liquor.

While I have mentioned in the above examples the use of calcium hydroxide as a reagent suitably adapted to effect the solubilization and extraction of naringin from its source material, other alkaline earth compounds may be used for this purpose, as, for example, barium hydroxide or strontium hydroxide. These latter are chemically effective. Whether they will desirably be utilized will depend upon the subsequent use, if any, to which it is intended to put the residual pulp.

While magnesium acts in some respects as an alkaline earth, it has been forcefully argued that it should not be considered as belonging to the alkaline earth group. Notwithstanding, I have found that, for example, $Mg(OH)_2$ or $MgCO_3$ may first be used to harden the peel, and the solubilization and extraction of the naringin may be effected by adding an alkaline earth compound such as $Ca(OH)_2$ to obtain the desired pH of extraction. It therefore follows that for the purpose of this process, magnesium may be considered as an alkaline earth at the hardening step, but it is not preferred for use in the extraction step. While it is possible with $Mg(OH)_2$ to alkalinize into the lower portion of the operative extraction range, uneconomical quantities of reagent are required.

In the examples given above I have indicated that the desired pH range within which the solubilization and extraction of the naringin may be effected, lies in the range from about pH 8.4 to about pH 9.1 at equilibrium. However this extraction step may be carried out with reasonably satisfactory results within a somewhat broader range, as for example from about pH 7.5 to about pH 9.5. In one grouping of extraction tests in which yield in pounds per ton was plotted against extraction pH at equilibrium, the rising curve was found to indicate a yield of about two pounds of naringin per ton of pulp being treated at about pH 7.5, and the falling curve was back down to about two pounds per ton at about pH 9.5. This same curve crossed the three pounds per ton line at about pH 8.4 and again at about pH 9.1, while the region between these two latter points was indicated as yielding slightly more than three pounds per ton. It should be understood that these yields are considered to be abnormally low since the tests were run upon quite mature fruit—fruit that might well be described as aged. On fresh, prime fruit, yields in the neighborhood of twice those above would be expected. However, the results as to pH are considered as representative of good commercial practice. The tests also indicated that the pH values given above are those which give the results indicated when the pulp going through the treating process encounters the usual time lag consequent upon handling large volumes of material, particularly in batch processes or processes which have some batch steps. Laboratory results indicate that with rapid handling, considerably higher pH values may be employed. Alkalinities up to as high as pH 11 will apparently operate without any serious alkaline degradation effects upon the naringin if the time of exposure at this pH condition is kept down to a matter of a few minutes.

While I have mentioned hydrochloric acid as being satisfactory for use in adjusting the pH of the liquor to within the range of about pH 4 to pH 5 for purposes of crystallization, I may use any acid which is capable of effecting the desired pH range of the liquor containing the naringin and which will also yield a soluble alkaline earth salt. Nitric acid, acetic acid, and others are satisfactory for this purpose. Use at this point of an acid which will yield a precipitate with the alkaline earth, such as sulfuric acid, citric acid, or carbonic acid, will at least introduce a filtration step into the procedure, or more likely, require recrystallization of the naringin if a product of high purity is desired.

While the desired pH range for crystallization has been indicated as lying within about pH 4 to about pH 5, it is desired to point out that crystallization apparently will occur to some extent beginning at about pH 7 and increasing to a moderately satisfactory rate at about pH 6. The acidification should not be carried to such a point as to cause destruction or breakdown of the naringin and for this purpose I prefer not to go below about pH 2.5.

Furthermore, in the above examples I have mentioned the use of only one extraction of the source material. It is obvious, however, that repeated extractions may be carried out on the source material in a manner well known to those skilled in the art. Furthermore I have found that additional amounts of naringin may be recovered by washing the extracted source material with water after the first extraction and then using this wash water to make up subsequent batches of fresh peel for extraction purposes.

By the methods which I have disclosed hereinabove, the source material, as, for example, citrus peel, may be subsequently readily dried and used as a stock feed. This is an advantage which does not reside with the processes previously used for the extraction of naringin with those alkali substances which produce soluble pectin compounds, since such processes so condition the material that it is very difficult to dry unless said soluble compounds are first removed, in which case the yield and the feed value of the dried residue are seriously impaired.

Having thus described my invention in such full, clear, concise, and exact language as to enable others skilled in the art to make and use the same, I claim as my invention and desire to secure by Letters Patent the following:

1. A process for the preparation of naringin which comprises the steps of adding, to plant material containing naringin, an alkaline earth compound and water in amounts sufficient to adjust the alkalinity of said mixture to within a pH range of about pH 7.5 to about pH 9.5, maintaining the so treated plant material within the said pH range for a time sufficient to permit solubilization and extraction of the naringin, recovering liquor containing naringin from said material, adjusting the pH of the liquor to between about pH 6 and about pH below which a substantial proportion of the naringin is destroyed, crystallizing naringin from said liquor, and finally separating the crystalline naringin from its mother liquor.

2. A process for the preparation of naringin which comprises the steps of adding, to plant material containing naringin an alkaline earth compound and water in amounts sufficient to adjust the alkalinity of said mixture to within a pH range of about pH 8.4 to about 9.1, maintaining the so treated plant material within the said pH range for a time sufficient to permit solubilization and extraction of the naringin, recovering liquor containing naringin from said material, adjusting the pH of the liquor to between about pH 6 and about pH 2.5, crystallizing naringin from said liquor, and finally separating the crystalline naringin from its mother liquor.

3. In a process for recovering naringin from citrus pulp source materials in which the source material is hardened and subjected to alkaline treatment to extract the naringin, the improvement which consists of hardening the pulp with alkaline earth compound an extracting the naringin from the hardened pulp with an aqueous solution of an alkaline earth hydroxide, said extraction being performed at a pH above about 7.5.

4. In a process for recovering naringin from citrus pulp source materials in which the source material is hardened and subjected to alkaline treatment to extract the naringin, the improvement which consists of hardening the pulp with alkaline earth compound and extracting the naringin from the hardened pulp with an aqueous solution of calcium hydroxide, said extraction being performed at a pH above about 7.5.

5. In a process for recovering naringin from citrus pulp source materials in which the source material is hardened and subjected to alkaline treatment to extract the naringin, the improvement which consists of hardening the pulp with a calcium compound and extracting the naringin from the hardened pulp with an aqueous solution of calcium hydroxide, said extraction being performed at a pH of above about 7.5.

6. In a process for recovering naringin from citrus pulp source materials in which the source material is hardened and subjected to alkaline treatment to extract the naringin, the improvement which consists of hardening the pulp with a magnesium compound and extracting the naringin from the hardened pulp with an aqueous solution of calcium hydroxide, said extraction being performed at a pH of above about 7.5.

7. A process for the preparation of naringin which comprises the steps of adding, to plant material containing naringin, an alkaline earth compound and water in amounts sufficient to adjust the alkalinity of said mixture to within a pH range of about pH 7.5 to about 9.5, maintaining the so treated plant material within the said pH range for a time sufficient to permit solubilization of the naringin, recovering liquor containing naringin from said material, adjusting the pH of the liquor to within a range of less than about pH 6 but greater than about pH 2.5 by means of hydrochloric acid, crystallizing naringin from said liquor, and finally separating the crystalline naringin from its mother liquor.

8. A process for the preparation of naringin which comprises the steps of adding, to plant material containing naringin, an alkaline earth compound and water in amounts sufficient to adjust the alkalinity of said mixture to within a pH range of about pH 8.4 to about 9.1, maintaining the so treated plant material within the said pH range for a time sufficient to permit solubilization of the naringin, recovering liquor containing naringin from said material, adjusting the pH of the liquor to within a range of less than about pH 6 but greater than about pH 2.5 by means of hydrochloric acid, crystallizing naringin from said liquor, and finally separating the crystalline naringin from its mother liquor.

WILLARD E. BAIER.

REFERENCES CITED

The following references are of record in the file of this patent:

UNITED STATES PATENTS

| Number | Name | Date |
|---|---|---|
| 2,348,215 | Higby | May 9, 1944 |

FOREIGN PATENTS

| Number | Country | Date |
|---|---|---|
| 486,898 | Great Britain | June 13, 1938 |